United States Patent Office 3,717,674
Patented Feb. 20, 1973

3,717,674
THERMAL PURIFICATION OF TEREPHTHALIC ACID USING A CARBOXYLIC ACID-C₈ AROMATIC SOLVENT
Jorge A. Blay, Corpus Christi, Tex., assignor to Celanese Corporation, New York, N.Y.
No Drawing. Continuation-in-part of application Ser. No. 705,601, Feb. 15, 1968. This application Nov. 29, 1968, Ser. No. 780,268
Int. Cl. C07c 51/48
U.S. Cl. 260—525
13 Claims

ABSTRACT OF THE DISCLOSURE

A process for the purification of terephthalic acid (TPA) by heating the TPA and a liquid medium comprised of a $C_8$ alkyl aromatic and a $C_1$–$C_{10}$ monocarboxylic acid, e.g. acetic, to a temperature above 275° C. or 325° C. depending on the catalyst present and until at least 50%, preferably 100%, of the TPA no longer remains as a solid. Pressures are such that a liquid phase is maintained when below the critical temperature. Following the heating, the mixture is cooled so as to crystallize the purified TPA.

BACKGROUND OF THE INVENTION

The present application is a continuation-in-part of my copending application Ser. No. 705,601 filed Feb. 15, 1968, now abandoned.

The present invention relates to the purification of terephthalic acid. More particularly, the present invention relates to the purification of terephthalic acid containing such impurities as 4-carboxybenzaldehyde.

Terephthalic acid is presently a very valuable industrial raw material because of its use in the manufacture of polyester synthetic fibers such as poly(ethylene terephthalate). However, commercial production of these polyester fibers has generally not been by the direct esterification of terephthalic acid because of the adverse effects of small amounts of impurities in the terephthalic acid. Instead the terephthalic acid is usually esterified with methanol to form dimethyl terephthalate which in turn is transesterified with the appropriate glycol and polymerized to form the polyester. Heretofore the conversion to dimethyl terephthalate has been considered necessary in order to eliminate the impurities in the terephthalic acid but it is readily apparent that it would be desirable to form the polyester directly from the terephthalic acid in order to eliminate the expensive and time consuming esterification, distillation and transesterification necessary when utilizing dimethyl terephthalate.

The adverse impurities in terephthalic acid are those arising during the course of its manufacture and therefore the particular impurities present may vary according to the process of manufacture. At the present time there are several methods for producing terephthalic acid such as the oxidation of alkylbenzenes. These oxidations of alkylbenzenes may be conducted for example by oxidizing p-xylene in the liquid phase with 30 to 40% nitric acid at about 200° C., either with or without added air or oxygen. Another method for the oxidation of p-xylene is with an oxygen-containing gas (such as air) at temperatures around 150° C. and in the presence of a heavy metal catalyst such as cobalt acetate or other Group VIII metal salts. This latter method is disclosed in U.S. Pats. 3,240,803; 3,171,856; 3,139,452; 3,119,860; 3,064,044; 3,004,066 and British Pat. 1,003,895. An alternative method for preparing terephthalic acid by the oxidation of alkylbenzenes is disclosed in U.S. Pat. 2,746,990 wherein diisopropyl benzene is oxidized to terephthalic acid. The methods for producing terephthalic acid are not however limited to the oxidation of alkylbenzenes and U.S. Pats. 3,243,457 and 3,096,366 disclose the production of terephthalic acid by the rearrangement of potassium salts of benzoic or phthalic acid. Such rearrangements are generally known as Henkel rearrangements. Regardless of the method of manufacture, the terephthalic acid will generally contain various impurities which are detrimental to polyester production, especially from the standpoint of color. The terephthalic acid produced by the processes now well known will generally have less than about 5% by weight of impurities in it. Although all of the troublesome impurities have not been identified, some of the more common impurities are 4-carboxybenzaldehyde, o-phthalic acid, m-phthalic acid, and p-acetylbenzoic acid. Of these impurities, 4-carboxybenzaldehyde is generally the most troublesome impurity and its amount has been used extensively as a criterion of effectiveness in purification processes. Of course the specifications for a fiber grade terephthalic acid vary according to the type of polymerization process to be used in forming the polyester and according to the process of manufacturing the terephthalic acid, but the specifications for fiber grade terephthalic acid generally require less than about 50 parts per million 4-carboxybenzaldehyde. In view of the stringent purity requirements the term "crude" terephthalic acid as used herein is not meant to cover only terephthalic acid having large amounts of impurities but is also meant to include terephthalic acid having extremely small but undesirable amounts of impurities. For example, terephthalic acid containing at least 40 parts per million of 4-carboxybenzaldehyde might be too impure for some end uses and thus could be considered "crude" terephthalic acid as far as the present invention is concerned. "Crude" terephthalic acid as used herein is also intended to cover and include terephthalic acid which may or may not have been subjected to other types of purification processes so as to partially purify the terephthalic acid.

Various processes have been devised to treat terephthalic acid for the removal of organic impurities and other impurities contributing to the quality and color of polyesters. Some of these processes include activated charcoal treatment of solutions of water soluble salts, alkaline oxidation with hypohalite or permanganate solutions of water soluble salts, water leaching, and treatment of aqueous solutions of alkaline salts with carbon monoxide. It has also been disclosed in such patents as U.S. 2,923,736, that crude terephthalic acid may be purified by sublimation followed by fractional condensation of the terephthalic acid from the resulting gas.

It is also disclosed in copending U.S. patent application Ser. No. 705,600 filed on Feb. 15, 1968, that crude terephthalic acid may be purified by heating it in an inert, liquid medium to a temperature above 325° C. followed by crystallization of the terephthalic acid from solution. It is also disclosed in copending U.S. patent application 705,616 filed Feb. 15, 1968, that metals from Groups I–B, II–B, and VIII of the Periodic Table serve as catalysts in the purification of terephthalic acid by thermal treatment.

SUMMARY

It is thus an object of the present invention to provide a process for the purification of impure terephthalic acid. It is a further object of the present invention to provide a process for the purification of crude terephthalic acid so as to produce a terephthalic acid suitable for fiber forming. Another object of the present invention is to provide a process for the reduction of impurities such as 4-carboxybenzaldehyde in an impure terephthalic acid. Additional objects will become apparent from the following description of the present invention.

These and other objects are accomplished by the present invention which in one of its embodiments is a method for improving the purity of a crude terephthalic acid comprising (1) heating crude terephthalic acid and a liquid medium comprised mainly of a mixture of a $C_8$ alkyl aromatic and a $C_1$–$C_{10}$ monocarboxylic acid free of ethylenic and acetylenic unsaturation to a temperature at which no more than about 50% of the terephthalic acid remains as a solid, said temperature being at least 275° C. when utilizing a Group VIII noble metal catalyst or at least 325° C. in other cases, the pressure being sufficient to maintain a liquid phase at temperatures below the critical temperature, (2) cooling the terephthalic acid and liquid medium so as to crystallize terephthalic acid and (3) recovering the thus crystallized, purified terephthalic acid. By the term "pressure being sufficient to maintain a liquid phase at temperatures below the critical temperature" is meant that if the required heating temperature does not exceed the critical temperature of the liquid phase present, then the pressure must be sufficient to maintain this liquid phase. Likewise, if the critical temperature is exceeded, then the pressure must be at least that which would cause a liquid phase to exist if the temperature were lowered to the critical temperature, Although applicant does not wish to be bound by any particular theory, it appears that many of the undesirable impurities, and in particular the 4-carboxybenzaldehyde impurities, are being selectively destroyed or decomposed during the heating step of the present invention. It has been found that a mixture of a $C_8$ alkyl aromatic and a $C_1$–$C_{10}$ monocarboxylic acid is an especially good liquid medium for use in the purification of terephthalic acid by thermal treatment and that better results may be obtained by using such a mixture than by the use of either alone. The products of the decomposition either remain in the mother liquor during recrystallizaton or remain in the TPA as impurities which are not especially harmful or undesirable. Regardless of the mechanism involved, the present process does provide purification above that obtained in a recrystallization process wherein for example a 5% slurry of terephthalic acid is merely heated to a temperature sufficient to dissolve it (such as about 250° C.) followed by recrystallization.

DESCRIPTION OF THE PREFERRED EMBODIMENTS

As may be seen from the above, the present invention calls for heating crude terephthalic acid and a liquid medium at temperatures above 275 or 325° C. such that no more than 50% of the crude acid remains as a solid although it is preferred that the heating be to a temperature such that none of the terephthalic acid remains as a solid. Since the heating step of the present invention is also limited to pressures sufficient to maintain a liquid phase at temperatures less than the critical temperature of the liquid phase, this means that at least 50% (and preferably 100%) of the terephthalic acid must be in the liquid phase (or in a gas phase which is in equilibrium with the liquid phase) if the critical temperature is not exceeded during the heating step. Whether this liquid phase which is present in some embodiments of the present invention is a solution of terephthalic acid in the liquid medium, is a solution of the liquid medium in the terephthalic acid or is merely a eutectic mixture of the two is not always clear. In some cases such as when the terephthalic acid is present in only very small percentages, it appears that the terephthalic acid does actually go into solution in the liquid medium. However when treating a mixture containing for example 85% terephthalic acid and 15% liquid medium, it is not exactly clear what the liquid phase should be called. As pointed out above when operating the present invention such that a liquid phase is present, there might or might not be a gas phase in equilibrium with the liquid phase depending on the method used for heating. For example, if one started heating a liquid-solid slurry at autogenous pressure in a closed container which was completely filled with the liquid-solid slurry, one should have only a single liquid phase present or a liquid-solid two phase system present unless critical temperature of the liquid phase was exceeded. It has also been observed in runs made in sealed capillary tubes that when one starts heating a sealed tube which is less than completely full but is over about half-full of liquid (or liquid-solid slurry), the liquid phase will sometimes expand to completely fill the tube before the critical temperature is reached. Thus in these situations a two-phase system is converted to a single phase system prior to reacting the critical temperature. In other runs made in sealed tubes wherein the tubes were less than half-full of liquid prior to heating, it was generally observed that a gas phase remained in equilibrium with the liquid phase until the critical temperature was reached at which time the interface between the gas phase and liquid phase would disappear.

The pressure limitation called for in the present process also means that if the critical temperature is exceeded, then at least 50% (and preferably 100%) of the terephthalic acid and the liquid medium must exist as a single plasma-like phase. The term "plasma-like phase" is used describing the physical state of a material which has been heated above the critical temperature since the material does not really seem to behave like a true gas but seems instead to have properties of both a liquid and a gas.

The actual final physical state of the material being heated and its physical state during the heating will of course vary according to the amount of terephthalic acid initially present and the final temperature reached during heating. Thus in heating a slurry of crude terephthalic acid and liquid medium in accordance with the present invention, all of the acid might go into solution in the liquid medium before the desired temperature of 275° C. or 325° C. is reached, in which case one would continue heating the solution to a final treatment temperature of at least 275° C. or 325° C. or higher, which final treatment temperature might or might not be above the critical temperature of the liquid phase. At this point the applicant would like to point out that the treatment temperatures actually used in the present invention should generally be below about 440° C. and thus the temperatures will usually range from 275° C.–440° C. when using the catalysts providing Group VIII noble metals and a range of 325–440° C. for the other metals or when no catalyst is present. The heating period required for the process of the present invention, i.e. the length of time the temperature must be held at the required temperature of at least 275° or 325° C., may vary widely and will depend on the particular temperature being utilized, the amount of impurities present, the degree of purification desired, etc. For a given treatment temperature the reduction of impurities increases with time; likewise, for a given length of time the reduction of impurities will increase as the temperature is increased. Although an increase in the time of heating above the required temperature will result in a greater reduction of impurities, it has also been found that some terephthalic acid will decompose at these high temperatures. Therefore to avoid excessive losses of terephthalic acid by decomposition the heating period should generally be less than about two hours, for example from 10 seconds to 2 hours and is preferably from about 2 minutes to 30 minutes. The preferred temperatures are from about 340–420° C. for a non-catalytic process and when using catalysts of Group I-B, II-B, or those of Group VIII having atomic numbers less than 29, while the preferred temperatures for those especially active catalysts which are of Group VIII noble metals are from about 310–420° C., especially 325–410° C.

Going back to the various things that might take place when treating a mixture of crude terephthalic acid and liquid medium in accordance with the present invention, one might find upon reaching 275 or 325° C. that more than 50% of the crude terephthalic acid remained as a solid so that the temperature must necesarily be raised above that until at least 50% of the crude acid solid does disappear. Usually as one heats the mixture all of the solid acid will disappear while there is still a liquid phase present, in other words before the critical temperature is reached. However, some observations have been made wherein it appeared that as the temperature of a mixture was increased, more and more of the solid terephthalic acid went into solution in the liquid medium (or formed a eutectic mixture or the like) but that the critical temperature of the liquid phase present was reached before all of the solid phase had disappeared. Thus a solid phase was present together with a plasma-like phase. When heating was continued the remaining solid gradually disappeared such that only a plasma-like phase was present. As those skilled in the art are well aware, it is extremely difficult to make observations at the critical point and at the temperatures involved in the present invention; therefore applicant does not wish to be bound by the foregoing observations.

The actual pressures deevloped in the heating step of the present invention are relatively high since they must be at least that pressure which will maintain a liquid phase at temperatures below the critical. These pressures will of course vary according to the amount of liquid medium present, the final temperature of heating and the like. It might generally be stated that the pressure during the heating step will be above 100 p.s.i.g. The process of the present invention is not conveniently operated at autogenous pressure, the volume of the system used for heating the desired volume of terephthalic acid in liquid medium being of course small enough that sufficient pressures are developed. If higher pressures are desired, nitrogen or other gases such as $CO_2$ may be added in order to maintain the desired pressure.

As was pointed out above the thermal treatment of terephthalic acid in a liquid medium is disclosed and claimed generally in copending application Ser. No. 705,600, and also disclosed and claimed, when conducted in the presence of a metal catalyst from Groups I–B, II–B, or VIII of Mendelyeev's Periodic Table in copending application Ser. No. 705,616. It has been found that when conducting a thermal purification treatment of terphthalic acid, a liquid medium comprised mainly of a mixture of an $C_1$–$C_{10}$ carboxylic acid free of ethylenic and acetylenic unsaturation and a $C_8$ alkyl aromatic is a particularly good liquid medium, the use of which can provide better results than the use of either a $C_8$ alkyl aromatic or a carboxylic acid alone. Water and other components may also be present although they should comprise less than 15% by weight of the liquid medium. The $C_1$–$C_{10}$ monocarboxylic acid used may be any of those containing from one to ten carbon atoms and which are free of acetylenic and ethylenic unsaturation. The monocarboxylic acid should also contain only carbon, hydrogen and oxygen. Thus the acid may be acetic, benzoic, butyric, phenylacetic, formic and the like. Preferably the carboxylic acid utilized is acetic acid or phenylacetic acid. Phenylacetic is also known as alpha-toluic acid and is of the formula $C_6H_6CH_2COOH$. The $C_8$ alkyl aromatic used may be either ethylbenzene, o-xylene, m-xylene, p-xylene or mixtures thereof but is preferably p-xylene. Usually the mixture of $C_8$ alkylbenzene and acid should comprise from about 0.5–50% monocarboxylic acid and 50–99.5% $C_8$ alkyl aromatic, the percentages being by weight. The preferred ranges are 2–20% by weight monocarboxylic acid and 80–98% $C_8$ alkyl aromatic.

The present invention may be conducted either in the absence of or in the presence of a catalyst. Some suitable catalysts include those compounds, inorganic salts, organic salts, chelates, etc. which will provide a metal from Groups I–B, II–B, and VIII of Mendelyeev's Periodic Table or the alkali metals. Groups I–B and II–B include the metals copper, silver, gold zinc, cadmium, and mercury. The Group VIII metals having atomic numbers below 29 include iron, cobalt and nickel while those having atomic numbers above 43 include ruthenium, rhodium, palladium, osmium, iridium, or platinum. The catalyst may provide the desired metal as the free metal itself, such as a palladium on charcoal catalyst, or may provide the desired metal in the form of a chemical compound such as cobalt acetylacetonate. When using a non-supported catalyst, that is when using a chemical compound as the source of the catalyst, the catalyst is preferably soluble under the reaction conditions. Of the various types of metal containing compounds that may be used as catalysts in the present invention it is preferred to use metal chelates, metal salts of organic carboxylic acids, for example $C_1$ to $C_{12}$ acids, or inorganic salts such as phosphates, bromides, sulfates and chromates. When using a supported catalyst it is preferred to use a supported noble metal catalyst due to catalyst recovery problems presented when using the non-noble metals. These catalyst recovery problems occur due to the fact that under the harsh conditions of the present process the non-noble metals will sometimes dissolve. Thus if one uses a non-noble metal supported catalyst, the dissolving of the metal will render the recovery of the catalyst extremely difficult if not impossible. On the other hand recovery of supported noble metal catalysts is fairly easy so that the catalyst may be reused. By noble metals as used herein is meant ruthenium, rhodium, palladium, osmium, iridium, platinum, silver and gold although those noble metals of Group VIII are the preferred metals for use when a supported catalyst is desired. In using supported catalysts it may be added in granular form to the reactants or may be in a fixed bed over which the terephthalic acid-liquid medium mixture passes.

In the process of the present invention a catalyst of one metal may be mixed with a catalyst of other metals. Of the Group I–B, II–B and VIII catalysts that are useful in the present invention, those of Group VIII generally give the best results. Those Group VIII catalysts which are of metals which have an atomic number greater than 43, i.e. the Group VIII noble metals are the most active with iridium being the most active catalyst of all. It is pointed out however that cobalt, although generally not as active as some of the other Group VIII catalysts, is a very good catalyst with many desirable features. Some specific catalyst that may be used in the present invention include cobalt acetate, cobalt bromide, cobalt acetylacetonate, cobalt naphthenate, cobalt terephthalate, cobalt propionate, cobalt benzoate, palladium acetate, auric cyanide, sodium hydroxide, lithium acetate, nickel acetylacetonate, mercuric acetate, iridium trichloride trihydrate, rhodium auric cyanide, $Fe(OH)(C_2H_3O_2)_2$, zinc chloride, cadmium propionate, osmium trichloride, ruthenium trichloride hydrate, chloroplatinic acid, silver cyclohexane butyrate, iridium on charcoal and palladium oxide on charcoal. The catalyst should generally be present in amounts so as to provide from about 100 p.p.m. to 6% weight percent of the metal based on the combined weight of the crude terephthalic acid and liquid medium, preferably in amounts of from 0.1% to 2%. The ranges are for the amount of the metal itself, e.g. cobalt, and not for the amount of a compound such as cobalt acetate which is used to provide the cobalt. Of course when a continuous process is being used and the catalysts are in fixed bed with the TPA-liquid medium mixture flowing therethrough, the catalyst should be present in sufficient amounts so as to provide the proper average contact time as discussed above, e.g. about 60 seconds to 30 minutes.

The process of the present invention may be carried out batchwise or in a continuous system and may be conducted in various types of equipment of various materials of construction, e.g. glass, stainless steel or titanium alloys. The crystallization called for in the present invention may be effected for example by merely cooling the solution such as in a tank crystallizer or may be effected in various other types of equipment such as crystallizing evaporators or vacuum crystallizers. The cooling during crystallization should generally be at least below 200° C. and is preferably below 100° C. in order to insure optimum recovery of the terephthalic acid. Since terephthalic acid is generally quite insoluble at ordinary temperatures in the liquid medium of the present invention, the mixture of crude terephthalic acid in liquid medium to be treated by this process will generally be in the form of a slurry or other mixture wherein the terephthalic acid is present as a solid. The slurries or other mixtures can be formed such as by adding crude terephthalic acid crystals to the liquid medium or they can be the effluent of processes wherein the crude terephthalic acid is already mixed with the liquid medium. The process of the present invention can also be applied to mixtures of terephthalic acid and liquid medium which have been preheated and are already at a temperature such that the terephthalic acid is in solution in the liquid medium. Also the process of the present invention may be operated such as by preheating the liquid medium alone to temperatures below or above 320° C. and then combining it with the crude terephthalic acid. In the process of the present invention, the crude terephthalic acid should be generally present in amounts of from about 3 to 95% based on the combined weight of the liquid medium and the crude terephthalic acid, preferably about 5 to 50% by weight, especially 5–30%.

The crude terephthalic acid to be treated according to the present invention may be derived from various sources and may be terephthalic acid which has been subjected to previous types of purification treatment. In general, the present invention is most useful in the purification of crude terephthalic acid derived from the oxidation of alkylbenzenes or from the rearrangement of inorganic salts of benzene carboxylic acids, however, best results are obtained when treating impure or crude terephthalic acid derived from the oxidation of p-xylene with an oxygen-containing gas in the presence of a heavy metal catalyst. Whatever the source of the terephthalic acid, it can be stated that the present invention is useful in treating crude terephthalic acid containing 4-carboxybenzaldehyde, o-phthalic acid, m-phthalic acid, and p-acetylbenzoic acid or mixtures thereof although it is most useful in removing 4-carboxybenzaldehyde impurities. As was pointed out above, terephthalic acid produced by the present well known processes will generally have less than about 5% by weight of impurities and quite frequently less than 1% by weight impurities. It should be kept in mind that the thermal treatment step of the present invention does not remove or decompose all types of impurities, e.g. metal impurities, which may be found in a crude terephthalic acid, and thus the present process may be combined with other purification treatments such as simple recrystallizations. For example, when treating a mixture of 85% crude acid and 15% liquid medium in accordance with the present invention, it may be desirable to add additional liquid medium after the thermal treatment step and before the terephthalic acid is crystallized so as to quench and/or so that the crystallization will be from a more dilute solution and thus remove more of the impurities that are amenable to separation from the acid by crystallization from a solution. Instead of adding the liquid medium after the thermal treatment, the acid could be crystallized, recovered, then redissolved and recrystallized from a solvent.

The following examples are given to illustrate specific embodiments of the present invention.

Example I

Three runs are made in which crude terephthalic acid containing about 0.4% by weight (4000 p.p.m.) of 4-carboxybenzaldehyde impurity is added to different liquid mediums such that the terephthalic acid is present in an amount of about 15% based on the combined weight of the liquid medium and the crude acid. In each run, about one-half milliliter of the liquid medium-crude acid mixture is added to a glass tube of about one milliliter volume, the glass tube sealed, and then heated to about 360° C. for 10 minutes such that no solid phase crude terephthalic acid remains. Following the heating, the sealed tubes and the contents thereof are quickly cooled to room temperature and the resulting crystallized terephthalic acid is recovered by filtration and analyzed. In one run the liquid medium is p-xylene, in another acetic acid and in another 10% by weight acetic acid and 90% by weight p-xylene. The purified terephthalic acid from the run utilizing p-xylene contains about 432 p.p.m. 4-carboxybenzaldehyde, that from the run utilizing acetic acid about 300 p.p.m. 4-carboxybenzaldehyde, and that utilizing the p-xylene-acetic acid mixture about 50 p.p.m. 4-carboxybenzaldehyde.

Example II

The process of Example I is repeated utilizing a liquid medium of about 24 weight percent phenylacetic acid and 76 weight percent p-xylene. The recovered terephthalic acid contains about 80 p.p.m. 4-carboxybenzaldehyde.

As may be seen from the above, the present process utilizing a mixture of a $C_8$ alkyl aromatic and a $C_1$–$C_{10}$ carboxylic acid provides very good results, and as may be seen from Example I, gives much better results than either medium used alone.

In order to prevent corrosion in metal vessels such as those constructed of stainless steel, a soluble phosphorus compound is preferably present in the process. A very wide variety of phosphorus compounds may be used but generally speaking the phosphorus compounds which are desirably present have a phosphorus atom linked to at least one oxygen or sulfur atom, preferably oxygen. This includes the addition of compounds to the process which already have a phosphorus-oxygen or phosphorus-sulfur linkage (such as orthophosphoric acid, triethyl phosphine oxide and phosphorus pentasulfide) or those which will form under the conditions of the process a compound or ion containing such a linkage. Some types of compounds which are desirable include the oxyacids of phosphorus, metal salts of the oxyacids of phosphorus, esters of the oxyacids of phosphorus, oxides of phosphorus and sulfides of phosphorus. Examples of the foregoing include orthophosphoric acid, pyrophosphoric acid, phosphoranedioic acid, orthophosphorus acid, hypophosphorous acid, monopotassium phosphate, trisodium phosphate, sodium acid orthophosphite, dipotassium pyrophosphite, tri-n-butyl phosphite, dimethyl methylphosphonate, triethyl phosphate, tricresyl phosphate, propyl phosphoric acid, ethyl diethylphosphinite, diethylphosphinic acid, ethyl phosphonic acid, ethyl diethylphosphinate, triethyl phosphine oxide, phosphorus trioxide, phosphorus pentoxide, phosphorus trioxide, phosphorus pentoxide, phosphorus tetrasulfide, and the like. When a metal salt of a phosphorus acid, such as $Co_3(PO_4)_2$, is used as the source of the phosphorus such as salt will also serve as the source of cobalt metal which acts as a catalyst as pointed out above. Extremely wide amounts of a phosphorus compound may be utilized in the present invention, for example from amounts of about 1 p.p.m. to amounts of 50,000 p.p.m. based on the combined weight of the crude terephthalic acid and liquid medium.

It has been observed in experiments conducted in sealed tubes wherein the treatment temperature was above the critical temperature such that the tubes were completely filled with the supercritical fluid, that where the tubes were initially fuller of the terephthalic acid slurry to be treated, better results were obtained. This indicates that better purification is obtained in the present process at lower expansion ratios.

The embodiments of the invention in which an exclusive property or privilege is claimed are defined as follows:

1. A method for improving the purity of a crude terephthalic acid comprising (a) heating crude terephthalic acid and an inert liquid medium comprised mainly of a mixture of about 50 to 99.5% by weight of a $C_8$ alkyl aromatic and 0.5 to 50% by weight of a $C_1$-$C_{10}$ monocarboxylic acid free of ethylenic and acetylenic unsaturation to a temperature at which no more than about 50% of the terephthalic acid remains as a solid, said temperature being at least 275° C. when utilizing a Group VIII noble metal catalyst, or at least 325° C. in other cases, when no catalyst is employed, the pressure being sufficient to maintain a liquid phase at temperatures below the critical temperature, (b) cooling the terephthalic acid and liquid medium so as to crystallize terephthalic acid and (c) recovering the thus crystallized, purified terephthalic acid.

2. The process of claim 1 wherein said liquid medium comprises a mixture of from about 2 to 20% by weight of acetic acid and from about 80 to 98% by weight of p-xylene.

3. The process of claim 1 wherein:
said crude terephthalic acid has been produced by the oxidation of p-xylene with an oxygen-containing gas and contains 4-carboxybenzaldehyde impurities and is present in amounts of from about 5 to 50% by weight based on the combined weight of crude terephthalic acid and liquid medium;

said liquid medium comprises a mixture of from about 2 to 20% by weight of acetic acid and 80 to 98% by weight of xylene; and said heating is to a temperature such that none of the terephthalic acid remains as a solid and for a period of at least 2 minutes, said period being such that the recovered purified terephthalic acid contains less of said 4-carboxybenzaldehyde impurities than that obtained in a simple recrystallization process wherein the same combination of crude terephthalic acid and inert liquid medium are heated to a temperature sufficient to dissolve the crude terephthalic acid followed by cooling the resulting solution to recrystallize the terephthalic acid.

4. The process of claim 3 wherein the temperature is from about 340 to 420° C. and wherein no catalyst is utilized.

5. The process of claim 3 wherein a Group VIII noble metal catalyst is utilized and the temperature is from about 310 to 420° C.

6. The process of claim 3 wherein the temperature is from about 325 to 440° C. and wherein a catalyst is present, said catalyst being one which will provide a metal which is a Group I-B, a Group II-B metal, a Group VIII metal having an atomic number below 29 or an alkali metal.

7. The process of claim 6 wherein an alkali metal catalyst is utilized.

8. The process of claim 6 wherein a cobalt catalyst is utilized.

9. The process of claim 3 wherein said xylene is p-xylene.

10. The process of claim 1 wherein the heating is continued until none of the terephthalic acid remains as a solid.

11. The process of claim 1 wherein the crude terephthalic acid is present in amounts of from about 5 to 50% by weight based on the combined weight of crude terephthalic acid and liquid medium.

12. The process of claim 1 wherein the temperature of heating is from about 340° C. to 420° C. and wherein no catalyst is utilized.

13. The process of claim 1 wherein the temperature of heating is from about 325 to 440° C. and wherein a catalyst is present, said catalyst being one which will provide a metal which is a Group I-B metal, a Group II-B metal, a Group VIII metal having an atomic number below 29 or an alkali metal.

References Cited
UNITED STATES PATENTS

| | | | |
|---|---|---|---|
| 2,317,455 | 4/1943 | Gubelmann et al. | 260—525 |
| 2,572,710 | 10/1951 | Emerson et al. | 260—525 |
| 3,364,256 | 1/1968 | Ichikawa et al. | 260—525 |
| 3,426,065 | 2/1969 | Duval et al. | 260—525 |
| 3,456,001 | 7/1969 | Olsen | 260—525 |
| 3,171,856 | 3/1965 | Kurtz | 260—525 |

LORRAINE A. WEINBERGER, Primary Examiner

R. S. WEISSBERG, Assistant Examiner

UNITED STATES PATENT OFFICE
CERTIFICATE OF CORRECTION

Patent No. 3,717,674                              Dated   February 20, 1973

Inventor(s)  Jorge A. Blay

It is certified that error appears in the above-identified patent and that said Letters Patent are hereby corrected as shown below:

In column 5, line 28, for "not" read -- most --.
In column 8, line 57, for "as" read -- a --.

Signed and sealed this 3rd day of July 1973.

(SEAL)
Attest:

EDWARD M. FLETCHER, JR.           Rene Tegtmeyer
Attesting Officer                 Acting Commissioner of Patents